US008626644B2

(12) United States Patent
Greig, Jr. et al.

(10) Patent No.: US 8,626,644 B2
(45) Date of Patent: Jan. 7, 2014

(54) SYSTEMS AND METHODS FOR LOAN OPTION CUSTOMIZATION

(76) Inventors: Russell H. Greig, Jr., Norcross, GA (US); Robert A. Greig, Potomac, MD (US)

(*) Notice: Subject to any disclaimer, the term of this patent is extended or adjusted under 35 U.S.C. 154(b) by 883 days.

(21) Appl. No.: 12/391,238

(22) Filed: Feb. 23, 2009

(65) Prior Publication Data

US 2009/0157543 A1 Jun. 18, 2009

Related U.S. Application Data

(63) Continuation-in-part of application No. 11/158,490, filed on Jun. 22, 2005, now abandoned.

(60) Provisional application No. 60/582,030, filed on Jun. 22, 2004.

(51) Int. Cl.
*G06Q 40/00* (2012.01)

(52) U.S. Cl.
USPC ........... 705/38; 705/35; 705/39; 705/36 R; 715/866; 715/209; 715/210; 235/375; 235/379

(58) Field of Classification Search
None
See application file for complete search history.

(56) References Cited

U.S. PATENT DOCUMENTS

| | | | | |
|---|---|---|---|---|
| 5,930,775 | A * | 7/1999 | McCauley et al. | 705/36 R |
| 6,067,533 | A * | 5/2000 | McCauley et al. | 705/38 |
| 6,823,319 | B1 * | 11/2004 | Lynch et al. | 705/38 |
| 6,901,384 | B2 * | 5/2005 | Lynch et al. | 705/38 |
| 6,938,008 | B1 * | 8/2005 | Stokes | 705/35 |
| 6,988,082 | B1 * | 1/2006 | Williams et al. | 705/36 T |
| 7,089,503 | B1 * | 8/2006 | Bloomquist et al. | 715/780 |
| 7,133,840 | B1 * | 11/2006 | Kenna et al. | 705/35 |
| 7,455,222 | B2 | 11/2008 | Beck et al. | |
| 7,472,089 | B2 | 12/2008 | Hu et al. | |
| 7,620,595 | B1 * | 11/2009 | Holt et al. | 705/38 |
| 7,941,365 | B1 * | 5/2011 | Bradley et al. | 705/38 |
| 7,945,510 | B1 * | 5/2011 | Bradley et al. | 705/38 |

(Continued)

OTHER PUBLICATIONS

Rob Garver. (May 27, 2003). In Focus: Retooled GSE Foe Inviting Flak Already. American Banker, p. 1. Retrieved May 24, 2012, from Accounting & Tax Periodicals.*

(Continued)

*Primary Examiner* — Gurkanwaljit Singh
(74) *Attorney, Agent, or Firm* — Jones IP Law, LLC; Dennis W. Jones

(57) ABSTRACT

In a loan option system having a loan server accessible through a network to an external borrower computer and a loan processor for providing loan parameters to the loan server, systems and methods are provided for determining and adjusting a loan balance, via (1) receiving a principal value for a loan through the network from the borrower computer, the principal value corresponding to the loan balance, wherein the loan has an interest rate and a loan term corresponding to a specified number of payments throughout the loan, (2) upon a permissible omitted payment, increasing the interest rate, determining accrued interest, setting predetermined fees due to the missed payment, and applying the predetermined fees and accrued interest to the loan balance to produce a new balance, (3) retrieving the new balance from the loan processor to the loan server, and (4) providing the new balance to the borrower computer.

10 Claims, 6 Drawing Sheets

(56) References Cited

U.S. PATENT DOCUMENTS

| | | | |
|---|---|---|---|
| 2002/0035530 A1* | 3/2002 | Ervolini et al. | 705/36 |
| 2002/0188533 A1* | 12/2002 | Sanchez et al. | 705/30 |
| 2002/0194122 A1* | 12/2002 | Knox et al. | 705/39 |
| 2003/0018557 A1* | 1/2003 | Gilbert et al. | 705/36 |
| 2003/0033242 A1* | 2/2003 | Lynch et al. | 705/38 |
| 2003/0046222 A1* | 3/2003 | Bard et al. | 705/38 |
| 2003/0149659 A1 | 8/2003 | Danaher et al. | |
| 2003/0225685 A1* | 12/2003 | Dickerson | 705/38 |
| 2004/0107161 A1* | 6/2004 | Tanaka et al. | 705/38 |
| 2004/0128233 A1 | 7/2004 | Jarzmik | |
| 2004/0225584 A1 | 11/2004 | Quinn et al. | |
| 2004/0254879 A1* | 12/2004 | Dickerson | 705/38 |
| 2005/0102229 A1 | 5/2005 | Kemper et al. | |
| 2005/0144130 A1* | 6/2005 | Staniar et al. | 705/40 |
| 2006/0074794 A1* | 4/2006 | Nespola, Jr. | 705/38 |
| 2006/0149663 A1* | 7/2006 | Nichols | 705/38 |
| 2007/0043655 A1* | 2/2007 | Phillips et al. | 705/38 |
| 2007/0250439 A1 | 10/2007 | Crocker | |
| 2007/0288357 A1 | 12/2007 | Holman et al. | |

OTHER PUBLICATIONS

Bonnie Sinnock. (Feb. 2003). Will Fannie Mae's Customization Effort Have 'PrepaymentPower'? National Mortgage News, 27(22), 5. Retrieved May 24, 2012, from Banking Information Source.*

DeMuth, Christopher C. "Case against Credit Card Interest Rate Regulation, The." Yale J. on Reg. 3 (1985): 201.*

Stavins, Joanna. "Credit card borrowing, delinquency, and personal bankruptcy." New England Economic Review (2000): 15-30.*

Pike, Richard, and Nam Sang Cheng. "Credit management: an examination of policy choices, practices and late payment in UK companies." Journal of Business Finance & Accounting 28.7-8 (2001): 1013-1042.*

Baku, Esmail, and Marc Smith. "Loan delinquency in community lending organizations: Case studies of neighborworks organizations." Housing Policy Debate 9.1 (1998): 151-175.*

Barro, Robert J. "The loan market, collateral, and rates of interest." Journal of money, Credit and banking 8.4 (1976): 439-456.*

Rattray, Daniel C. "Calculating Late Payment Interest Penalties under the Prompt Payment Act: A Primer." Army Law. (1995): 14.*

* cited by examiner

SYSTEMS AND METHODS FOR LOAN OPTION CUSTOMIZATION

CROSS-REFERENCE TO RELATED APPLICATIONS

This application is a continuation-in-part of, and claims the benefit of and priority to U.S. patent application Ser. No. 11/158,490, entitled "Loan Option Algorithm Adaptable to Fully Variable Option Loans and Fixed Option Loans," filed Jun. 22, 2005, which claims benefit under 35 U.S.C. §119(e) of U.S. Provisional Patent Application Ser. No. 60/582,030, entitled "Loan Option Algorithm Adaptable to Fully Variable Option Loans and Fixed Option Loans," filed Jun. 22, 2004, each of which is incorporated herein by reference as if set forth herein in its entirety.

TECHNICAL FIELD

The present invention relates generally to loan customization. More particularly, this invention relates to systems and methods for providing loan option customization capability.

BACKGROUND

In conventional loan arrangements, as by a bank lending funds to a borrower, an interest rate and schedule of payments are typically agreed upon in advance. The periodicity of payments are typically monthly, although longer or shorter periods may also be agreed upon. Usually, both the interest rate, as applied to the unpaid balance of the loan, and the periodicity are fixed and are generally non-negotiable thereafter.

In such a typical loan arrangement the borrower is required to adhere to the amount of each payment, which includes both principal and interest, and to the payment schedule although the term of the loan may be reduced by advanced payments. If a payment is missed, or even if a payment is late, there is usually a penalty, such as by having the unpaid capital increased by a specific amount, thus increasing the interest portion of each subsequent payment, or an automatic increase in the interest rate. It often happens that, for some reason, such as a temporary incapacity or a temporary financial pinch, the borrower cannot make the payment that is due at a particular time, and then has no recourse other than to submit to the penalties. In extreme cases, the lender may even foreclose on the amount of the unpaid principal, as by taking any security deposit the borrower has made, and further, demanding payment of any loan balance not covered by the security deposit. While such extreme cases are typically modified by existing state law, the fact remains that the loan contract has been breached and the lender, within the bounds of existing law, may demand payment of the unpaid balance.

SUMMARY

Briefly described, and according to one embodiment, the present invention is directed towards systems and methods for providing loan option customization. As embodied in the present invention, loan option customization allows a borrower the option of omitting scheduled payments without incurring penalties. Fully variable option loans, fixed option loans and conventional loans are available to the borrower.

A fully variable option loan sets the loan parameters, such as the loan amount, interest rate, and payment period at the outset. Once these parameters are agreed upon between the borrower and the lender, a borrower can omit a payment at the time of their choosing and in accordance with the predetermined parameters. Typically, the privilege of omitting payments becomes available after some predetermined number of payments is made. Thus, the borrower can decide to omit, for example, one payment every twelve months, one payment every six months, one payment every three months, or one payment every other month, or even omit payments on a random basis, for example. Typically, omitted payments are not allowed in consecutive payment cycles.

A fixed option loan is typically less flexible than the fully variable option loan. Typically, a predetermined schedule of omitted payments is arranged during pre-loan negotiations. Again, the privilege of omitting payments typically becomes available after some predetermined number of payments is made.

Pre-loan negotiation allows the loan processor to permit the borrower to choose one of the three available loan options after the parameters of the loan have been agreed upon. Thus, the borrower may choose a conventional loan, a fixed option loan or a fully variable option loan.

For each of the three loan types, the status and number of allowable missed or omitted payments is negotiated at the outset. Of course, it is also possible to provide for one or more partial payments as an option. In those instances where a partial payment is made, it can be treated in the same manner as a full payment if this has been pre-negotiated, so long as the lower payment is between zero and a standard full payment amount. The status of the loan is updated in the same manner as for an optional or scheduled missed payment.

The status of the loan is updated by determining whether an omitted payment (or partial payment) is permissible, and if so, by readjusting the remaining period of the loan, or the interest rate, or both. Where the omitted payments are not permissible, penalties and extra fees may be incurred.

It is an object of the present invention to provide a loan option system for determining and adjusting loan parameters, comprising (1) a loan processor configured to determine loan parameters based upon a combination of received loan information and available loan options, wherein the loan options include: (a) at least one missed payment per specified period, (b) increased loan term, and (c) adjustable interest rate due to exercise of a missed payment privilege, and (2) a loan server accessible through a network, the loan server configured to: (a) receive the loan information from a borrower computer external to the loan server, (b) provide the loan information to the loan processor, (c) retrieve processed loan information from the loan processor, and (d) provide the processed loan information to the borrower computer, wherein the processed loan information includes the loan parameters and loan option information.

It is a further object of the present invention to adjust the loan parameters based upon loan option type.

It is a further object of the present invention that a loan option type can be (1) a fixed option loan, (2) a variable option loan, (3) a conventional loan.

It is a further object of the present invention to calculate and adjust loan fees.

It is a further object of the present invention to calculate and adjust interest rates.

It is a further object of the present invention to provide web access to services provided by the loan processor, that is accessible through a web browser executed on the borrower computer external to the loan option system.

It is an object of the present invention to provide within a loan option system having a loan server accessible through a network to a borrower computer external to the loan option system and a loan processor for providing loan parameters to the loan server, a computer implemented method for determining and adjusting a loan balance, comprising: (1) receiving a principal value for a loan through the network from the borrower computer, the principal value corresponding to the loan balance, wherein the loan has an interest rate and a loan term corresponding to a specified number of payments throughout the loan, and (2) upon a permissible omitted payment: (a) increasing the interest rate, (b) determining accrued interest, (c) setting predetermined fees due to the missed payment, and (d) applying the predetermined fees and accrued interest to the loan balance to produce a new balance, (3) retrieving the new balance from the loan processor to the loan server, and (4) providing the new balance to the borrower computer.

It is a further object of the present invention to increase the loan term.

It is a further object of the present invention to determine a new payment that corresponds to the new balance, the increased loan term and the increased interest rate.

It is a further object of the present invention to monitor and count missed payments.

It is a further object of the present invention to increase the loan term once a predetermined number of omitted payments have been exceeded.

It is a further object of the present invention that once the number of missed payments exceeds a set maximum of misses during a specified period, (1) the principal value due is determined, (2) interest is applied to the principal, (3) fees are determined, (4) calculating a payment based on the principal, the interest rate, and any fees, and (5) applying the principal to the balance.

It is a further object of the present invention to provide web access to the new balance through a web browser on a borrower computer.

It is an object of the present invention to provide within a loan option system having a loan server accessible through a network to a borrower computer external to the loan option system and a loan processor for providing loan parameters to the loan server, a computer implemented method for determining and adjusting a loan balance, comprising: (1) receiving a principal value for a loan through the network from the borrower computer, the principal value corresponding to the loan balance, wherein the loan has an interest rate and a loan term corresponding to a specified number of payments throughout the loan, (2) upon an omitted payment: (a) increasing the loan term upon determination that a predetermined number of omitted payments has been exceeded; and (b) adjusting the interest rate upon determination that the interest rate is a floating rate, (3) determining a new balance based upon the loan term and the adjusted interest rate, (4) retrieving the new balance from the loan processor to the loan server, and (5) providing the new balance to the borrower computer.

It is a further object of the present invention to provide web access to the new balance through a web browser on the borrower computer.

It is a further object of the present invention that once an unplanned missed payment occurs, (1) the principal value due is determined, (2) interest is applied to the principal, (3) fees are determined, (4) calculating a payment based on the principal, the interest rate, and any fees, and (5) applying the principal to the balance.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Reference is now made in detail to the description of the embodiments of systems and methods for providing loan option customization as illustrated in the accompanying drawings. The inventions may, however, be embodied in many different forms and should not be construed as limited to the embodiments set forth herein; rather, these embodiments are intended to convey the scope of the inventions to those skilled in the art. Furthermore, all "examples" given herein are intended to be non-limiting.

Loan option customization as embodied in the present invention allows a borrower the option of omitting scheduled payments without incurring penalties. Fully variable option loans, fixed option loans and conventional loans are available to the borrower.

A fully variable option loan sets the loan parameters, such as the loan amount, interest rate, and payment period at the outset. Once these parameters are agreed upon between the borrower and the lender, a borrower can omit a payment at the time of their choosing and in accordance with the predetermined parameters. Typically, the privilege of omitting payments becomes available after some predetermined number of payments is made. Thus, the borrower can decide to omit, for example, one payment every twelve months, one payment every six months, one payment every three months, or one payment every other month, or even omit payments on a random basis, for example. Typically, omitted payments are not allowed in consecutive payment cycles.

A fixed option loan is typically less flexible than the fully variable option loan. Typically, a predetermined schedule of omitted payments is arranged during pre-loan negotiations. Again, the privilege of omitting payments typically becomes available after some predetermined number of payments is made.

Pre-loan negotiation allows the loan processor to permit the borrower to choose one of the three available loan options after the parameters of the loan have been agreed upon. Thus, the borrower may choose a conventional loan, a fixed option loan or a fully variable option loan.

For each of the three loan types, the status and number of allowable missed or omitted payments is negotiated at the outset. Of course, it is also possible to provide for one or more partial payments as an option. In those instances where a partial payment is made, it can be treated in the same manner as a full payment if this has been pre-negotiated, so long as the lower payment is between zero and a standard full payment amount. The status of the loan is updated in the same manner as for an optional or scheduled missed payment.

The status of the loan is updated by determining whether an omitted payment (or partial payment) is permissible, and if so, by readjusting the remaining period of the loan, or the interest rate, or both. Where the omitted payments are not permissible, penalties and extra fees may be incurred.

Figure 1:
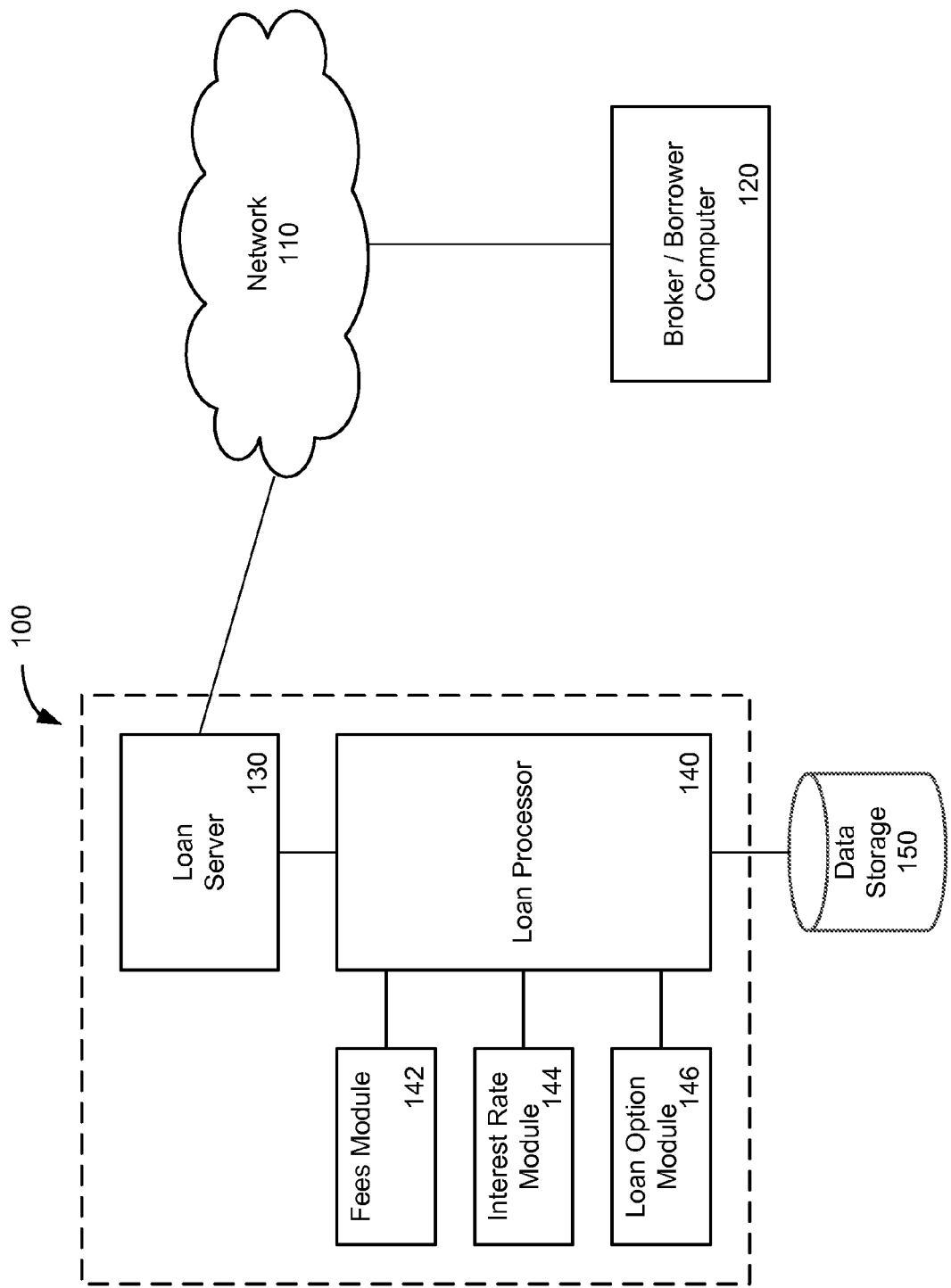
FIG. 1 is system for providing loan option customization in accordance with the present invention.

Referring now to the drawings, FIG. 1 is an exemplary loan processing system 100 for providing loan option customization. In the exemplary loan processing system 100, a user utilizing a computer such as a broker computer 120 (or borrower computer) accesses a loan server 130 through a network 110. The network 110 can be a local area network (LAN), the Internet, or a wireless network, for example. The loan server 130 is typically accessed using a web browser or a stand-alone program operating on the broker computer 120. Those of skill in the art will readily understand that the loan server 130 can also be accessed from a computer system hosting the loan server 130, as well as from other computer systems accessing the loan server 130 through other networks. Although the loan server is typically located on a computer system separate from the broker computer 120, it is also possible that the loan server 130 can be operated from within the broker computer 120 system. It will be readily appreciated that the loan server will typically also include a web server for providing the access to the loan option customization system.

The loan server 130 typically provides access to various application programs such as a loan processor 140, among others. The loan processor 140 provides functionality for loan option customization through access to a fees module 142, an interest rate module 144 and a loan option module 146. The loan option module 146 is responsible for modifying various loan parameters in response to changing conditions, such as missed payments, for example, and transforms the loan instrument based on these parameters. The results of this transformation are then presented to the borrower computer 120, for example, through a web browser accessing a web server at the loan server 130.

The loan processor 140 typically receives information through the network 110 from the broker computer 120, but may also access other sources such as a data warehouse or other data storage 150.

Figure 2:
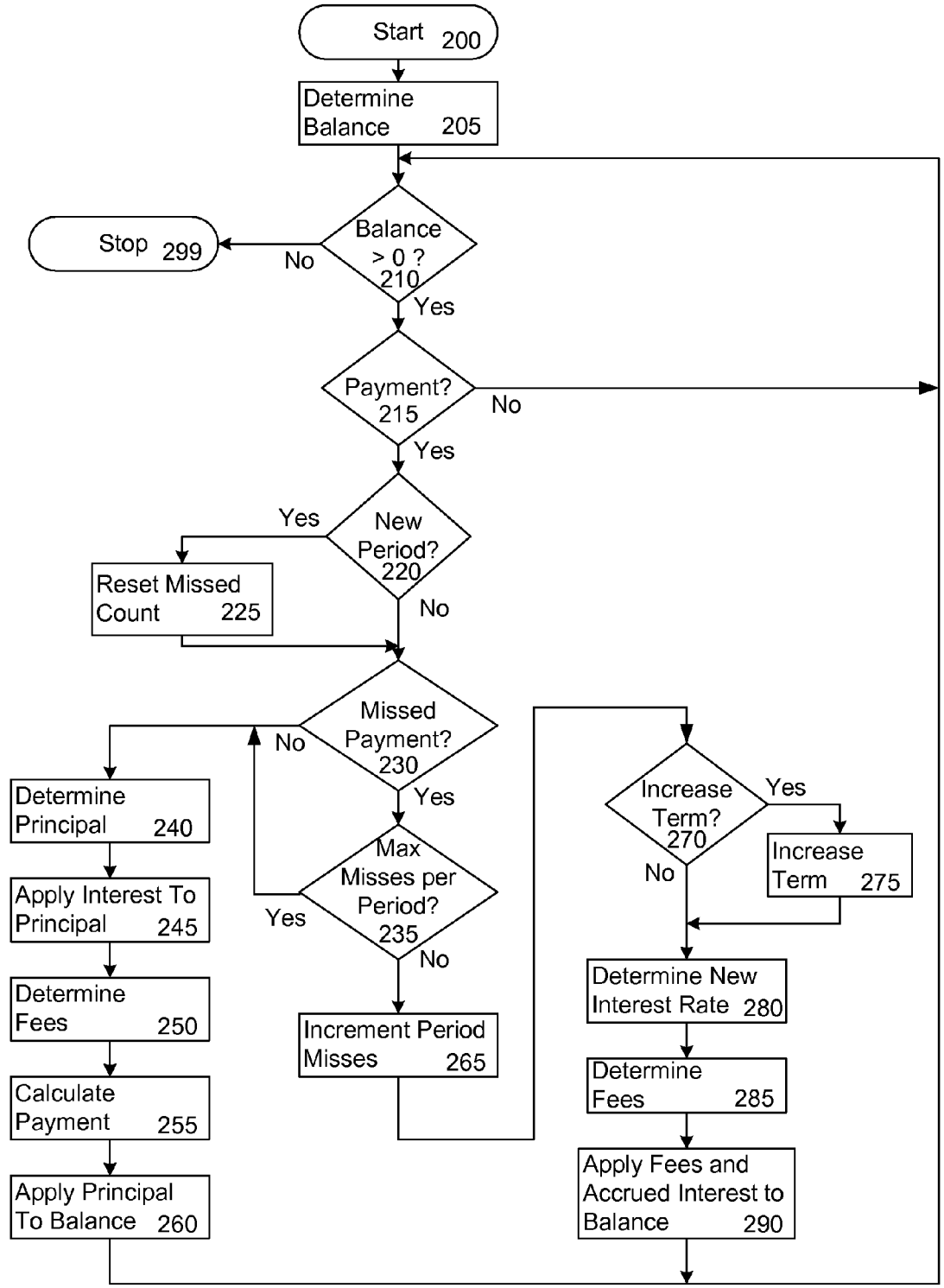
FIG. 2 is a flowchart illustrating a fully variable option loan process in accordance with the present invention.

FIG. 2 is a flowchart 200 illustrating a fully variable option loan process in accordance with the present invention. A variable option loan allows for skipped or missed payments, and determines how those missed payments are treated in the loan processing system 100. After a prospective borrower (or broker) is offered a choice of available loan options, the parameters of the loan are determined. The borrower's choice of loan options affects the amount of the loan, as well as the term, interest and allowable omitted payments. The borrower can exercise the non-payment privilege at a time of their choosing, thus the loan option is variable.

In addition to setting the parameters of the loan, (1) a determination is made whether to change the interest rate, and by how much, after a missed payment, and (2) the subsequent incremental payments may be increased or remain the same after a missed payment—whether the term of the loan is changed or remains fixed.

Referring again to FIG. 2, initial loan information is typically received by the loan processor 140 from a broker or borrower for example, at a broker computer 120. The initial loan information includes an initial loan balance that is determined at step 205. The loan balance can be input by a user at a remote computer such as the broker computer 120, or retrieved from data storage 150, for example. Additionally, the loan balance can be determined by retrieving and processing alternative input information, for example, through a network 110, over the Internet, or from other data sources. The loan balance is checked at step 210, and if the balance is zero the processing stops at step 299.

As shown in step 215, if a payment is due then processing continues for a determination of whether any missed payments have occurred. If a payment due is not made, the balance remains unchanged and processing continues to monitor the balance. A borrower is allowed a specified number of missed payments, as specified in pre-loan negotiations, and these are typically specified as an amount of missed payments per period. One non-limiting example allows for one missed payment per calendar year. Another non-limiting example allows for one missed payment per six-months. It is within the capability of the loan processing system to specify any number of missed payments per specified time period subject to values determined during pre-loan negotiations.

If a payment is made, then a check for new period is performed at step 220. A period can be any predetermined and agreed upon set of time intervals, such as six-months, 12-months, for example. If for example, the agreement allows for one missed payment every 12 months, then making a payment restarts the period and the missed payment counter is reset to zero at step 225. Of course, if the missed payment counter was already zero, then it remains so.

When a payment is missed, as is checked at step 230, the missed payment count is tabulated and checked against a maximum amount of missed payments allowed for the respective period at step 235. Once the maximum missed payments per period are reached, then the principal amount due is determined at step 240. Otherwise, a counter for missed payments within the period is incremented at step 265, and then a check is made at step 270 regarding increasing the term. Unless pre-arranged otherwise, the term is increased at step 275 due to the missed payment. In either event, a new interest rate is determined at step 280 as is typically agreed upon during pre-loan negotiations. Any fees resulting from the missed payment are determined at step 285, and then the fees, if any, together with the accrued interest are applied to the balance of the loan at step 290.

Once the balance of the loan is updated, the process returns to step 210 using the updated parameters for interest, term, or both.

In the event that the maximum number of missed payments is achieved at step 235, then as noted above, the principal due is determined at step 240, and the remaining processing is the same as applies to a normal (standard, conventional) loan where interest is applied to the principal at step 245, fees are determined at step 250, the payment is calculated at step 255, the result is applied to the balance at step 260, and the processing then returns to step 210 for the next cycle.

The exemplary fully variable option loan shown in FIG. 2 depicts one cycle of a loan, whatever the length or term of the loan may be. Updated loan balances will be used at step 210 and will be updated at the end of each cycle for the remainder of the life of the loan. It will be readily appreciated that the updated values for balance, interest, term, etc. may be stored in a data warehouse or other storage devices within or external to the loan option system as is common in the art.

Figure 3:
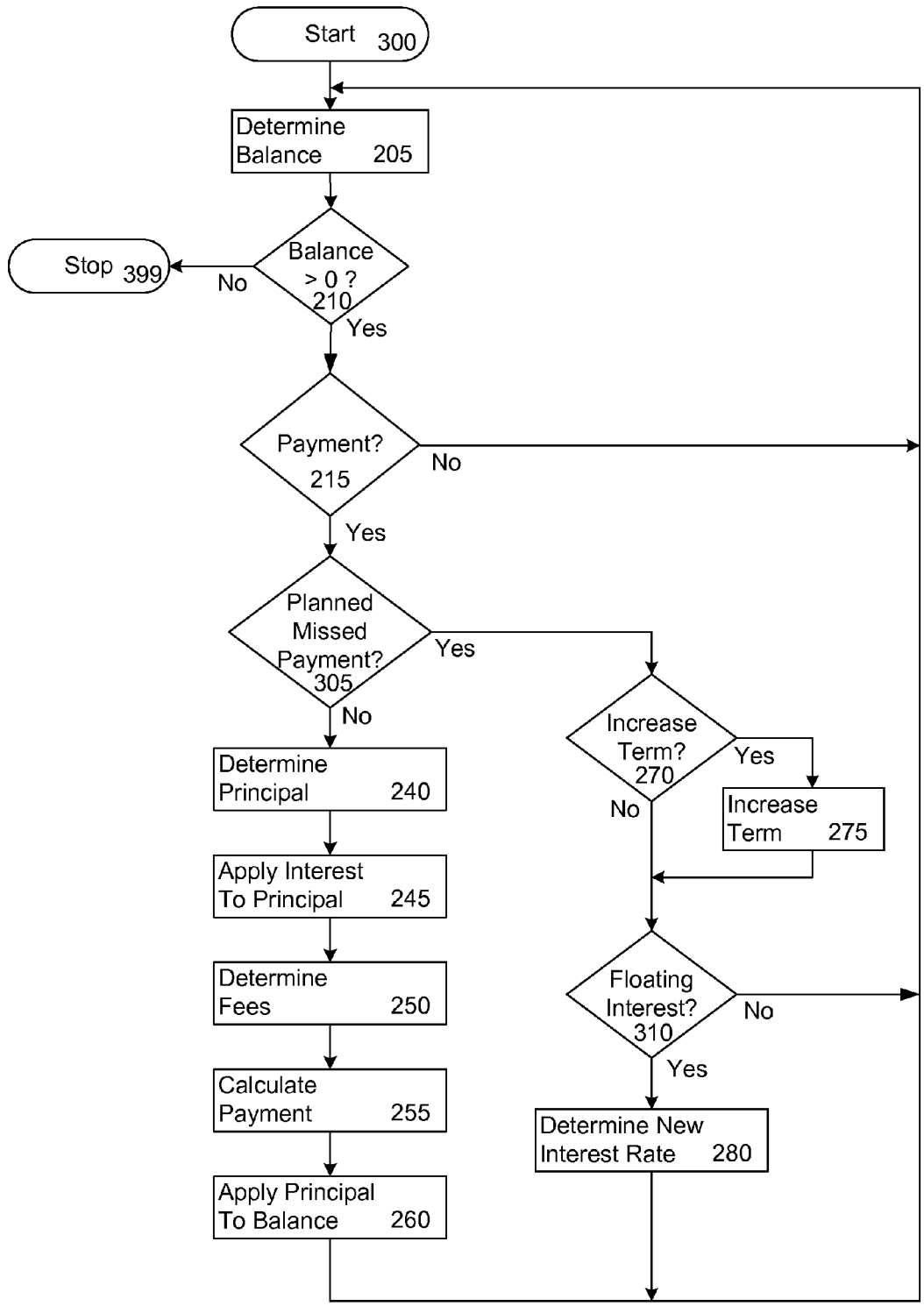
FIG. 3 is a flowchart illustrating a fixed option loan process in accordance with the present invention.

FIG. 3 is a flowchart 300 illustrating a fixed option loan process in accordance with the present invention. A fixed option loan allows the borrower to arrange for a predetermined schedule of omitted payments. The privilege of omitting payments typically becomes available after some predetermined number of payments is made.

In the embodiment shown in FIG. 3, the schedule of payments, including omitted payments, is agreed upon along with the interest rate on unpaid balances. It is typically agreed that the interest rate floats, and can be determined at a designated time, by a benchmark rate such as the Prime Rate as set by the Federal Reserve, or the interest rate of government T-bills, for example. Thus, when a payment is missed, for example, the T-bill rate or Prime Rate at that time becomes the loan interest rate. The floating of the interest rate can also be based upon an agreed upon rate sampling schedule, or it can be applied at the time each payment becomes due.

Referring again to FIG. 3, initial loan information is typically received by the loan processor 140 from a broker or borrower, for example, accessing the loan option customization system over through a web browser from borrower computer 120. The initial loan information includes an initial loan balance that is determined at step 205. The loan balance is checked at step 210, and if the balance is zero the processing stops at step 399.

As shown in step 215, if a payment is due then processing continues for a determination whether any missed payments have occurred. If a payment due is not made, the balance remains unchanged and processing continues to monitor the balance at step 205. A scheduled omitted payment is checked for at step 305. If a payment is made when an omitted payment was scheduled, then the principal balance is determined at step 240, and the remaining processing is the same as applies to a normal (standard, conventional) loan where interest is applied to the principal at step 245, fees are determined at step 250, the payment is calculated at step 255, the result is applied to the balance at step 260, and the processing then returns to step 205 for the next cycle.

If it is determined at step 305 that the omitted payment occurred as planned, then an increased loan term is calculated at steps 270 and 275. Unless pre-arranged otherwise, the term is increased at step 275 due to the missed payment.

A determination is made whether the interest rate is a floating interest rate at step 310. If the interest rate is floating, then the new interest rate is determined at step 280. The new interest rate is used in the next loan cycle at step 205. If the interest rate is fixed (not floating), then processing continues at step 205 for the next loan cycle. Typically, an agreement will require that a new interest rate is set following a planned omitted payment.

It will be appreciated that in both the fully variable option loan of FIG. 2 and the fixed option loan of FIG. 3, the resulting new interest rate (if any) is applied along with the new balance value as determined in step 260 are applied at the beginning of a new loan cycle. Thus, after each payment due or omitted payment, as the respective circumstance may be, a new loan cycle is commenced throughout the entire term of the loan. In establishing the parameters of the loan, the parties may agree that the interest rate remains fixed, floats, or increases at the time of option exercise by a fixed amount. In addition, it may be agreed that the term of the loan remains the same but that the amount of each payment is increased as well as the interest after an option exercise and thereafter, or that both interest and term remain the same but that the amount of the remaining payments is increased.

Figure 4A:
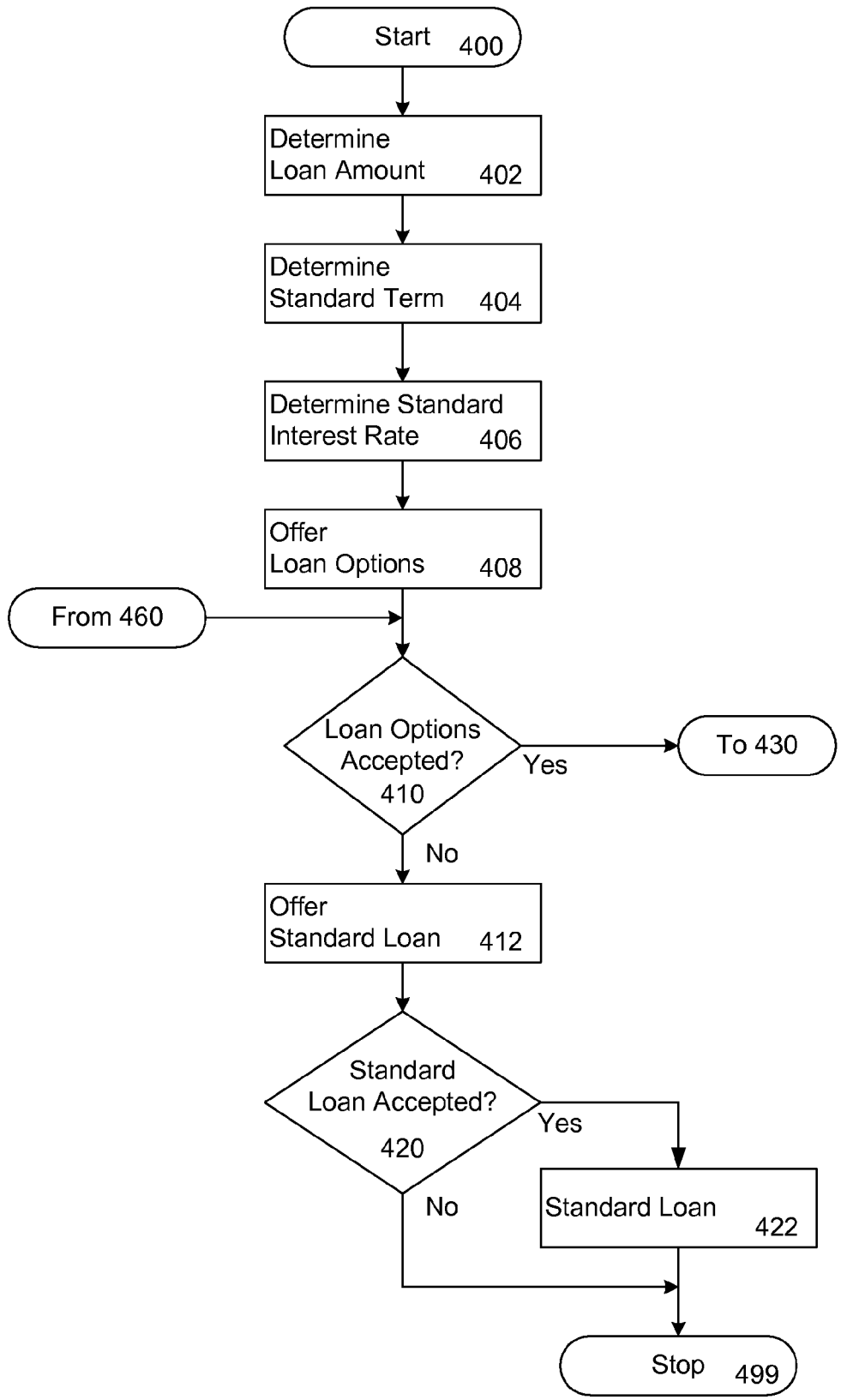
FIGS. 4A, 4B and 4C together are a flowchart illustrating a process for a combined standard loan, fully variable option loan, and fixed option loan in accordance with the present invention.
Figure 4B:
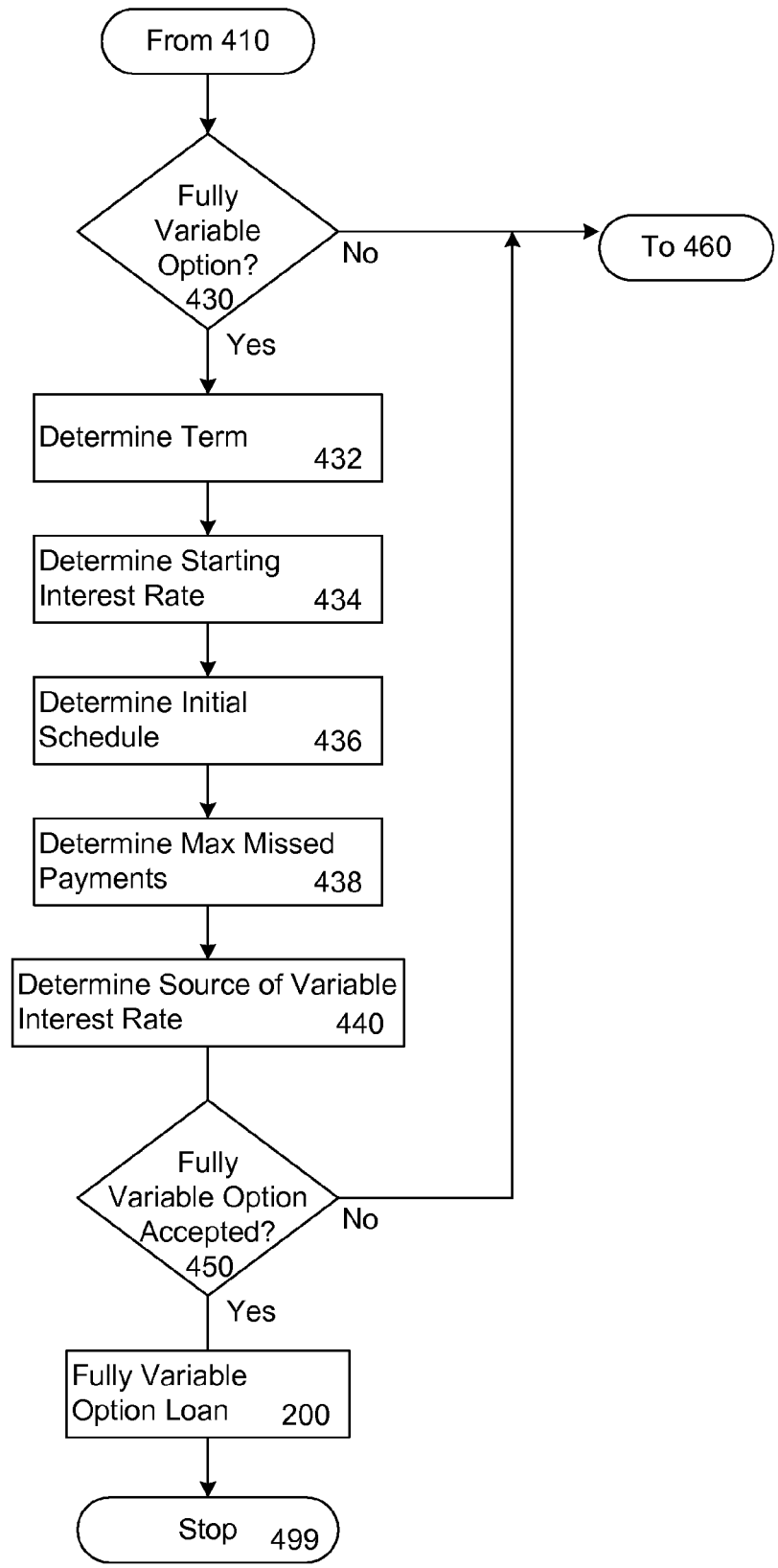
Figure 4C:
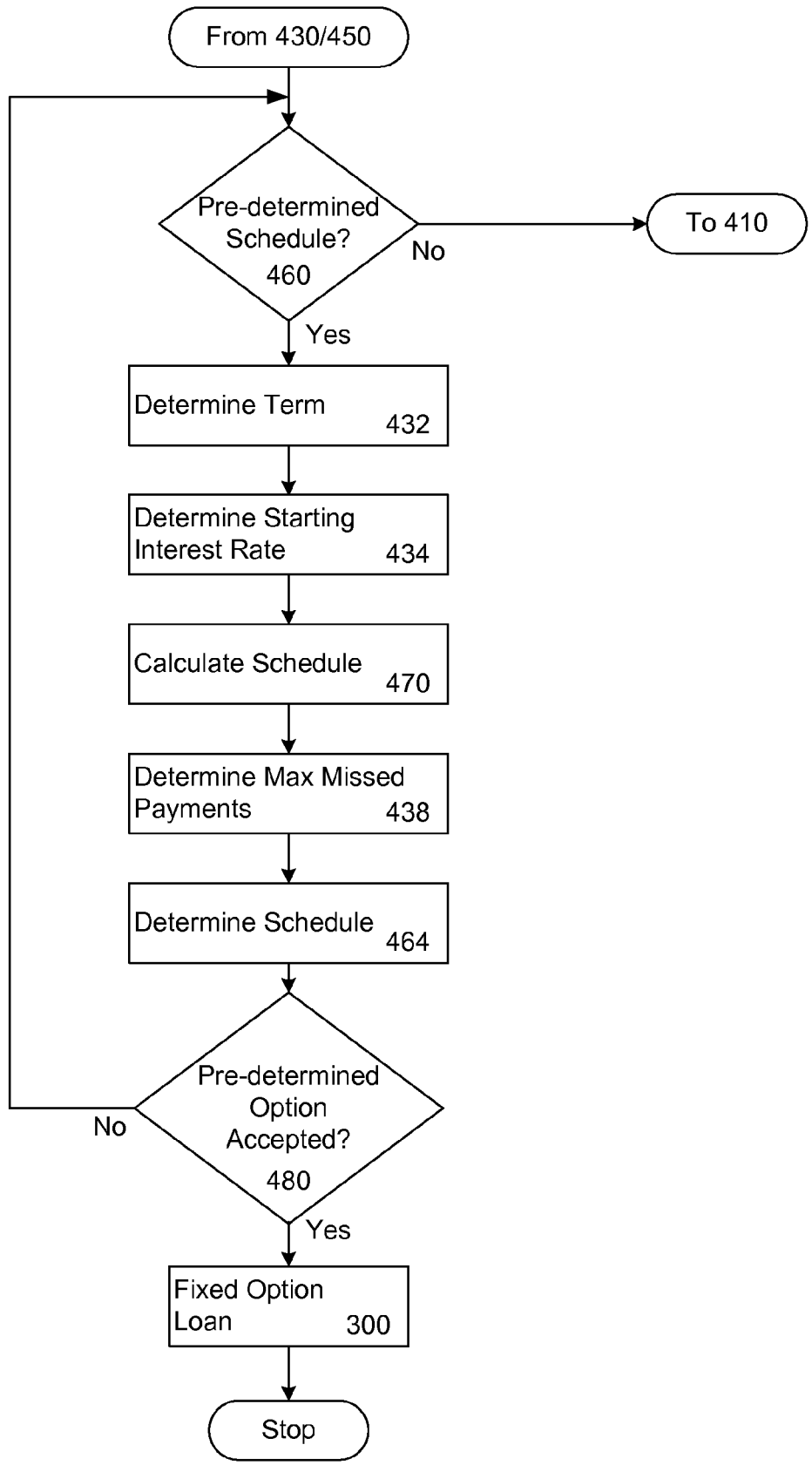

FIGS. 4A, 4B and 4C together are a flowchart 400 illustrating a process for a combined standard loan, fully variable option loan, and fixed option loan in accordance with the present invention. The negotiation and choices available to the borrower are included, as well as exercise of the fully variable option loan 200 of FIG. 2 and the fixed option loan 300 of FIG. 3. Upon selection of the desired payment arrangement, either the fully variable option loan 200 or the fixed option loan 300 are activated. Otherwise, a standard (conventional) loan arrangement determines the loan payments.

The amount of the loan is determined and noted at step 402, after which the standard term is determined at step 404, and then the standard interest rate is determined at step 406. The loan options are then offered at step 408. Loan options are either accepted or rejected through a series of steps beginning with step 410. If loan options are accepted at step 410, then the fully variable option loan is offered at step 430. (The fully variable option loan is discussed further below.) If the fully variable option loan is rejected, then the fixed option loan (or pre-determined schedule) is offered at step 460. (The fixed option loan is discussed further below.) If the fixed option loan is rejected at step 460, then effectively loan options are rejected and a standard loan is offered at step 412. If the standard loan is accepted then the previously determined payment schedule is put into effect at step 422 in accordance with the parameters determined at the outset. If the standard loan is refused, then the process ends at step 499. Of course, at this point the process can also start over with re-negotiation of all previously determined parameters at step 400.

As noted above, if loan options are accepted at step 410, the fully variable option loan is presented at step 430. Refusal of the fully variable option loan results in the fixed option loan being offered at step 460. If the borrower accepts the fully variable option loan, then negotiations take place to determine the term of the loan at step 432, the starting interest rate at step 434, the initial payment schedule at step 436, the maximum number of missed payments at step 438, and the source or basis for determining the variable (floating) interest rate, if any.

Once the negotiations are complete, if the borrower accepts the fully variable option loan at step 450, then the fully variable option loan is processed in accordance with step 200 at FIG. 2, through the life of the loan ending at step 499 or when the loan is terminated for some other reason. Otherwise, as noted above, the fixed option loan is offered at step 460.

As noted above, if the fully variable option loan is refused at step 430, the fixed option (pre-determined schedule) loan is presented at step 460. Refusal of the fixed option loan results in the standard loan being offered at step 412. If the borrower accepts the fixed option loan, then negotiations take place to determine the term of the loan at step 432, the starting interest rate at step 434, the schedule is calculated at step 462, the maximum number of missed payments at step 438, and the final schedule is determined at step 470.

If the fixed option loan is accepted at step 480, then the fixed option loan is processed in accordance with step 300 at FIG. 3. If the fixed option loan is refused, then the process of loan selection begins again at step 410.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. In a loan option system having a loan server accessible through a network to a borrower computer external to the loan option system and a loan processor for providing loan parameters to the loan server, a computer implemented method for determining and adjusting the loan parameters, the method comprising:

receiving a principal value for a loan via the loan processor from the borrower computer, the principal value corresponding to the loan balance, wherein the loan has an interest rate and a loan term corresponding to a specified number of payments, and wherein at least one omitted payment is permissible within a specified period, and wherein the specified period is any period negotiated at loan inception, and wherein the interest rate increases by a specified amount for each omitted payment, wherein the specified amount is a value negotiated at loan inception;

upon determining via the loan processor that an omitted payment has occurred and that the omitted payment is permissible, updating the loan parameters via the loan option module, wherein said updating the loan parameters includes:

increasing the interest rate via the loan processor in concert with an interest rate module;

determining accrued interest via the loan processor in concert with the interest rate module;

determining applicable fees via the loan processor in concert with a fee module, due to the omitted payment; and determining an updated loan balance via the loan option module according to the loan balance, the accrued interest, and the applicable fees;

providing the updated loan balance to the loan server via the loan processor; and providing the updated loan balance from the loan server to the borrower computer via the network.

2. The computer implemented method of claim 1, further comprising increasing the loan term.

3. The computer implemented method of claim 2, further comprising determining a new payment, wherein the new payment corresponds to the updated loan balance, the increased loan term and the increased interest rate.

4. The computer implemented method of claim 1, further comprising increasing an omitted payment count.

5. The computer implemented method of claim 4, further comprising increasing the loan term upon determination that a predetermined number of omitted payments have been exceeded.

6. The computer implemented method of claim 4, further comprising upon a determination that the omitted payment count exceeds a predetermined maximum for a specified period:

determining via the loan processor the principal value due;

applying interest via the loan processor in concert with an interest rate module to the principal value based on the interest rate;

determining applicable fees via the loan processor in concert with a fee module;

calculating via the loan processor a payment based on the principal value, the interest rate and the fees; and applying via a loan option module the principal value to the loan balance.

7. The computer implemented method of claim 1, further comprising providing at least one web page to a web browser on the borrower computer, wherein the at least one web page provides access to the updated loan balance.

8. In a loan option system having a loan server accessible through a network to a borrower computer external to the loan option system and a loan processor for providing loan parameters to the loan server, a computer implemented method for determining and adjusting a loan balance, the method comprising:

receiving a principal value for a loan through the network from the borrower computer, the principal value corresponding to the loan balance, wherein the loan has an interest rate and a loan term corresponding to a specified number of payments throughout the loan;

receiving a principal value for a loan via the loan processor from the borrower computer, the principal value corresponding to the loan balance, wherein the loan has an interest rate and a loan term corresponding to a specified number of payments, and wherein at least one omitted payment is permissible within a specified period, and wherein the specified period is any period negotiated at loan inception, and wherein the interest rate increases by a specified amount for each omitted payment, wherein the specified amount is a value negotiated at loan inception;

upon determining via the loan processor that an omitted payment has occurred and that the omitted payment is permissible, increasing the loan term via a loan option module upon determination that a predetermined number of omitted payments has been exceeded; and adjusting the interest rate via the loan processor in concert with an interest rate module upon determination that the interest rate is a floating rate;

determining an updated loan balance via the loan option module based upon the loan term and the adjusted interest rate;

providing the updated loan balance to the loan server via the loan processor; and providing the updated loan balance from the loan server to the borrower computer via the network.

9. The computer implemented method of claim 8, further comprising providing at least one web page to a web browser on the borrower computer, wherein the at least one web page provides access to the updated loan balance.

10. The computer implemented method of claim 8, further comprising upon a determination that the omitted payment was not planned:

determining via the loan processor the principal value due;

applying interest via the loan processor in concert with an interest rate module to the principal value based on the interest rate;

determining applicable fees via the loan processor in concert with a fee module;

calculating via the loan processor a payment based on the principal value, the interest rate and the fees; and applying via a loan option module the principal value to the loan balance.

* * * * *